United States Patent Office 2,843,567
Patented July 15, 1958

2,843,567

ALKALINE EARTH METAL TITANIUM ALKOXIDE CATALYSTS FOR PREPARING AROMATIC POLYCARBONATES

Jack L. R. Williams and Kenneth R. Dunham, Rochester, N. Y., assignors to Eastman Kodak Company, Rochester, N. Y., a corporation of New Jersey No Drawing. Application December 20, 1954
Serial No. 476,546

10 Claims. (Cl. 260—77.5)

This invention relates to highly polymeric linear polycarbonates prepared by the self-condensation in the presence of an alkaline earth metal titanium alkoxide as an ester-interchange catalyst of certain monomeric materials, i. e. 1,4-bis($\beta$-hydroxyethyl)-benzene-bis-(alkyl or aryl carbonate) or 4,4'-bis($\beta$-hydroxyethyl)-biphenyl-bis-(alkyl or aryl carbonate) or starting materials of these same two series as more fully defined below and which are hereinafter referred to as bis-(carbonate) monomers. This invention also includes polycarbonates prepared by condensing mixtures of these bis-(carbonate) monomers with themselves or with related bis-(carbonate) monomers. Furthermore, this invention relates to the processes involved in preparing polycarbonates using these new catalysts.

It is an object of this invention to provide superior highly polymeric linear polycarbonates which are valuable in preparing fibers, film etc. as described herein. It is a further object of this invention to provide unexpectedly superior catalysts for use in the polymerization of certain bis(carbonate) monomers of the series which includes 1,4-bis-($\beta$-hydroxyethyl)-benzene-bis-(alkyl or aryl carbonates), and 4,4'-bis-($\beta$-hydroxyethyl)-biphenyl-bis(alkyl or aryl carbonates). An additional object of this invention resides in providing processes for converting various bis-(carbonate) monomeric starting materials into polycarbonates. Other objects will become apparent hereinafter.

Linear polycarbonates prepared by the condensation of p-xylylene glycol and m-xylylene glycol with an alkyl carbonate have been described by Carothers and his followers in the prior patented art as well as in Carothers' collected papers. Practically no subsequent work appears to have been performed in connection with the preparation of such linear polycarbonates. The materials prepared as described in Carothers' collected papers were of relatively low molecular weight and do not constitute highly polymeric linear crystalline polycarbonates which have high melting points, high intrinsic viscosities and which are useful in the formation of photographic film, fibers, threads, textile fabrics, electrical insulating materials, etc. The product obtained by Carothers is said to be a powder melting at less than 185° C. and having a molecular weight of not much more than 1,000. The products of the instant invention are highly polymeric polycarbonates which possess high intrinsic viscosity and high melting points such that they can be extruded to form films and the like which can be mechanically worked and heat-set to form molecularly oriented structures. According to Carothers, all of the polycarbonates described were prepared by alcoholysis between a glycol and ethyl carbonate in the presence of an alkaline catalyst, such as sodium, whereby vapors of an alcohol were driven off by heating.

One of Carothers' followers suggests that a trace of an aliphatic dibasic acid can be introduced into the reactants in Carothers' process whereby "super polycarbonates" can be produced by heat under a vacuum.

The prior art does not describe any satisfactory procedure which will produce linear highly polymeric polycarbonates having melting points of generally well above 200° C. and having intrinsic viscosities of at least about 0.7 in a 60% phenol: 40% tetrachloroethane solution. The process of the instant invention represents a great improvement over that described in the prior art since it provides a simple, direct, easily reproducible process, and the polycarbonates obtainable have unexpectedly superior characteristics.

There are other regards in which the polycarbonates of this invention are superior to those described in the prior art. These include the percentage of elongation, tenacity, elastic recovery, work recovery, stress relaxation, tensile strength, resistance of films to tearing and to repeated folding, modulus of elasticity, electrical properties, etc.

This invention is limited in scope to the particular class of bis-(carbonate) monomers disclosed since experiments demonstrate that only such compounds (and a few others described in copending applications) can be employed to produce highly polymeric linear polycarbonates of the type with which this invention is concerned.

The novel process of this invention for producing polycarbonates comprises (A) self-condensing a bis-(carbonate) monomer selected from the group consisting of those having the following formulas:

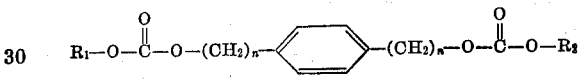

and

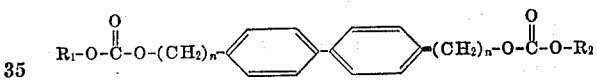

wherein $R_1$ and $R_2$ each represents a radical selected from the group consisting of lower alkyl radicals containing from 1 to 4 carbon atoms and aryl (including aralkyl and alkaryl) radicals of the benzene series containing from 6 to 8 carbon atoms and $n$ represents a positive integer of from 2 to 6, (B) in the presence of an alkaline earth metal titanium alkoxide having the following general formula:

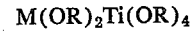

wherein M represents an alkaline earth metal selected from the group consisting of magnesium, calcium and strontium and each R represents an alkyl radical containing from 1 to 18 carbon atoms, (C) at an elevated temperature, (D) the condensation being conducted in an inert atmosphere and (E) the latter part of the condensation being conducted at a very low pressure.

It can readily be seen from the description of the process that there is no problem involved in adjusting the ratio of carbonate constituent to 1,4-bis($\beta$-hydroxyethyl)-benzene or equivalent constituent in the reaction vessel since the polycarbonates are produced according to this invention by the self-condensation of only one starting material. This establishes the composition of the polycarbonate produced since there can be no variation in the proportion of carbonate and glycol constituents. Moreover, the nature of this process makes it admirably suited to conducting the process on a continuous basis since no problems are involved in maintaining critical proportions of reactants.

Examples of the starting materials, i. e. the bis-(carbonate) monomers which can be used in the process of this invention include 1,4-bis-($\beta$-hydroxyethyl)-benzene-bis-(ethyl carbonate), 1,4-bis-($\gamma$-hydroxypropyl)-benzene-bis - (p - toluyl carbonate), 4,4' - bis - ($\beta$ - hydroxyethyl)-biphenyl - bis - (phenyl carbonate), 4,4' - bis - ($\beta$ - hydroxyethyl) - biphenyl - bis - (n - butyl carbonate) 1,4- bis - (β - hydroxyethyl) - benzene - bis - (isopropyl carbonate, 4,4' - bis - (delta - hydroxybutyl) - biphenyl - bis- (methyl carbonate), etc.

In carrying out the process of this invention, the ester-interchange catalysts which can be employed as condensing agents are limited to the alkaline earth metal titanium alkoxides. It would perhaps appear that any of the well-recognized ester-interchange catalysts would be operative. However, this has not been found to be the case. Very unexpectedly, it has been discovered that only certain compounds of titanium can be satisfactorily employed as catalysts to produce the polyesters of this invention. Other compounds, even including some compounds of titanium, which are well recognized ester-interchange catalysts promote the degradation of the starting material with the formation of ethylenic unsaturation and cross-linking. Some of those compounds of titanium which can be advantageously employed are disclosed in copending applications 397,037 (Reynolds and Van Den Berghe) and 397,038 (Reynolds and Dunham) filed on December 8, 1953. These applications are now U. S. patents 2,789,970 and 2,789,971, issued on April 23, 1957. The preparation and use of alkaline earth metal titanium alkoxides as catalysts is described in copending application Serial No. 313,072, filed October 3, 1952, by J. R. Caldwell as regards processes for preparing polyesters from glycols in general condensed with dicarboxylic acids in general. This application is now U. S. Patent 2,720,502, issued October 11, 1955.

The alkaline earth metal titanium alkoxide catalysts can be advantageously employed in an amount of from about 0.005% to about 0.2% by weight based on the weight of the bis-(carbonate) monomer or monomers being condensed. Higher or lower percentages can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of stage I is advantageously in excess of 200° C. Lower temperatures can also be employed. Although it is convenient to consider the condensation process as being conducted in two separate stages, the actual condensation itself continues smoothly from stage I into stage II. The principle of distinction between the so-called two stages lies in the fact that during stage II, the pressure of the adjacent atmosphere under which the condensation is performed is greatly reduced. Although the temperature can remain the same for both the first and the second stage, it is advantageous to employ a somewhat higher temperature at about the same time the pressure is reduced, especially when the liquid phase process is being employed. The temperatures used during the latter part of stage II can advantageously be as great as 250° or higher; the maximum temperature which can be employed is determined by the tendency of the polycarbonate to decompose at extremely high temperatures. As a practical matter, it is most advantageous to employ a maximum temperature of not much more than about 250° C. When a solid phase process is employed, the maximum temperature can be restricted to much lower temperatures, although the time required to accomplish the production of desirable linear polymeric polycarbonates may be increased accordingly.

The reduced pressure which is employed during stage II of the condensation is advantageously less than about 15 mm. of Hg of pressure. Most advantageously, the pressure is on the order of about 0.5 mm. of Hg of pressure. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one half to 4 or 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of temperature throughout the reaction mixture and to otherwise facilitate the condensation. However, this is not essential, especially when small quantities of bis-(carbonate) monomers are being condensed. During the course of the reaction, an alkyl ester or an aryl ester of carbonic acid will be evolved as a gas, as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline polycarbonates having melting points generally above 200°, high intrinsic viscosities, etc. as described in various copending applications, Serial Nos. 397,036 to 397,040 and 399,822 (Reynolds and Dunham or Van Den Berghe filed on December 8, 1953) and Serial Nos. 407,804–407,806 (same inventors, filed on February 2, 1954). These applications are now U. S. Patents 2,789,509 and 2,789,964–2,789,972, inclusive, issued April 23, 1957.

In this specification, all intrinsic viscosities are measured by standard procedures employing solutions in 60% phenol 40% sym. tetrachlorethane.

The bis-(carbonate) monomers have been found to possess certain qualities that can be improved upon by the formation of interpolycarbonates as described in the copending applications filed on February 2, 1954, Serial Nos. 407,804–407,806 referred to above. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and interpolycarbonates can be suitably blended or mixed with other polycarbonates, polyesters, polyurethanes, polyamides, polystyrenes, polyethylene, etc. insofar as the polycarbonates of this invention are compatible with such high polymers. The products which can be produced include waxes, fibers, molded articles, extrusion products, coating materials, etc.

The polycarbonates of this invention can be prepared by various continuous processes employing many types of apparatus known to be useful in conducting various related continuous processes as described in the prior art, for example, the method described in U. S. 2,647,885 can be suitably adapted. For another example, reference is made to application, Serial No. 397,040 referred to above.

The bis-(carbonate) monomers employed in accordance with his invention can be prepared as described in the copending applications referred to above. Other similar compounds can be employed in modification of the bis(carbonate) monomers whose formulas have been given above. Such similar compounds not mentioned in the referenced copending applications include 4,4'-bis- (γ-hydroxypropyl)-bibenzyl-bis-(propyl carbonate), p,p'-bis(delta - hydroxy - n - butyl)-1,6-diphenyl-n-hexane-bis (phenyl carbonate), 4,4'-bis(β-hydroxyethoxy)-benzanilide-bis-(ethyl carbonate), and other compounds related homologously to these. Some of these compounds and interpolycarbonates thereof can be prepared in the following manner wherein the final step illustrates our invention as regards the novel catalysts:

EXAMPLE 1a

4,4'-bis(bromomethyl)bibenzyl

Seven hundred and twenty-eight grams (4 moles) bibenzyl, 480 grams (16 moles) paraformaldehyde, 2.5 liters carbontetrachloride, and 300 cc. glacial acetic acid were treated with gaseous hydrogen bromide, with good stirring at reflux temperature for 40 hours. At that time, most of the carbon tetrachloride was removed by distillation and an equal volume of glacial acetic acid was added. More hydrogen bromide was passed in for eight hours as before. The reaction mix was cooled and the crystals precipitated were filtered by suction on glass cloth. The crystals were washed with cold ether and recrystallized from alcohol. The white crystalline solid at M. P. 115–117° resulted. The best yield of 4,4'-bis(bromomethyl)bibenzyl was 1015 grams or 69%—the theoretical value.

EXAMPLE 1b

4,4'-bis(acetoxymethyl)bibenzyl

Six hundred and fifty grams (1.76 moles) 4,4'-bis(bromomethyl)bibenzyl, 650 grams (7 moles) anhydrous sodium acetate, and 5 liters of glacial acetic acid were refluxed for 24 hours in a Glascol heater. The excess acetic acid was distilled at reduced pressure and the residual oil poured into ice water with stirring. The crystals were filtered and washed well with water. After two crystallizations from ethyl alcohol, the white material melted at 122°–123°. The yield was 70% of the theoretical value.

EXAMPLE 1c

4,4'-bis(hydroxymethyl)bibenzyl

Four hundred grams (1.15 moles) of 4,4'(acetoxymethyl)bibenzyl was dissolved in 3 liters of methyl alcohol containing 3% by weight of gaseous hydrogen chloride and was refluxed for three hours. The excess solvents were removed at reduced pressure from a steam bath. The residual liquid was poured onto ice water. The white solid precipitated was recrystallized from benzene, M. P. 159°–160°. The yield of 4,4'-bis(hydroxymethyl)bibenzyl was 50% the theoretical value.

EXAMPLE 1d

4,4'-bis(hydroxymethyl)bibenzyl-bis(ethyl carbonate)

Fifty three grams (0.21 mole) 4,4'-bis(hydroxymethyl)bibenzyl in 300 cc. pyridine was treated with 40 grams (0.42 mole) of ethyl chloroformate at 0–10° C. After stirring ½ hour, the reaction mixture was poured into ice water and the product was filtered and washed with water. The white crystalline compound was recrystallized from alcohol using decolorizing carbon. The product, with M. P. 75–76°, was obtained in 78% yield. Analysis calcd. for $C_{22}H_{16}O_6$—C, 68.5; H, 6.7. Found: C, 68.4; H, 6.8.

The bis-(carbonate) monomer of Example 1d preceding example can be homopolymerized to form useful polymers; however, it can be more advantageously employed to form an interpolycarbonate as described in Example 1e.

EXAMPLE 1e

Polymerization of 4,4'-bis(hydroxymethyl)bibenzyl-bis (ethyl carbonate)

Five grams of 4,4'-bis(hydroxymethyl)bibenzyl-bis (ethyl carbonate) ten grams of 1,4-bis(β-hydroxyethyl)-benzene-bis-(ethyl carbonate) and 0.02 g. of MgTi $(OC_4H_9)_6$ were placed in a polymerization tube under nitrogen atmosphere. The tube was inserted into an oil bath, heated to 200° C. and nitrogen was bubbled through the colorless melt. The temperature was slowly raised. At 230° C. a noticeable amount of ethyl carbonate was liberated. After one hour, at atmospheric pressure, the system was placed under a reduced pressure of 0.3 mm. of mercury for two hours. The product was a viscous melt which crystallized into a white, hard polymer of high intrinsic viscosity which could be formed into useful fibers, films, rods, etc.

EXAMPLE 2a

β-(p-Nitrophenoxy)ethanol

See Boyd and Marle, J. C. S., 105, 2117–2119 (1914), C. A. 9, 198 (1915) as to this preparation. A solution of 190 grams (1.37 moles) p-nitrophenol and 1370 cc. 2 N sodium hydroxide solution together with 185 cc. (2.74 moles) ethylene chlorohydrin were refluxed for four hours. After cooling, the light yellow crystals were collected and recrystallized from ethyl acetate. They were recrystallized from a 50% ethyl alcohol-water mixture. The yield of light yellow product, M. P. 83–85° C., was 64% of the theoretical value.

EXAMPLE 2b

β-(p-Aminophenoxy)ethanol

See Binkley and Hamilton, J. A. C. S., 59, 1716–1719 (1937), as to this preparation. Seventy grams (0.38 moles) β-(p-nitrophenoxy)ethanol in 200 ml. of absolute alcohol was reduced at 50 pounds pressure, using $PtO_2$ as catalyst. The reduction was run at room temperature (24° C.) in a pressure-bottle hydrogenator. The reaction mixture was filtered and the alcohol removed by distillation at reduced pressure. After crystallization from alcohol, the white crystalline material was melted at 72° C. The yield of β-(p-aminophenoxy)ethanol was 95% of the theoretical value.

EXAMPLE 2c

Methyl p(β-hydroxyethoxy)benzoate

Eight hundred and twenty-nine grams (6 moles) p-hydroxybenzoic acid, 510 grams (12.5 moles) sodium hydroxide in 1125 ml. water and 483 grams (6 moles) ethylene chlorohydrin were mixed with care and then refluxed for 2½ hours. The resulting hot solution was poured into ice water and the solution acidified. The solid precipitated was filtered and washed well with water. After drying, this light yellow solid was dissolved in a minimum of methanol and 1 liter of dry benzene was added. Three ml. of methane sulfonic acid was then added and this solution was refluxed under an azeotropic stillhead fitted with a condenser. When the water ceased coming over, the excess solvents were distilled and the residual oil was crystallized from a methyl alcohol-ethyl ether mixture. The yield of white product, M. P. 66–67° C., was 49% of the theoretical value. Analysis: Calcd. for $C_{10}H_{12}O_4$: C, 61.2, H, 6.1. Found: C, 61.1, H, 6.4.

EXAMPLE 2d

4,4'-bis(β-hydroxyethoxy)benzanilide-bis(ethyl carbonate)

One hundred grams (0.3 mole) 4,4'-bis(β-hydroxyethoxy)benzanilide in 500 ml. of pyridine was treated with 70 grams (0.6 mole) ethylchloroformate at 0–5° C. with vigorous stirring. The reaction mixture was poured into two volumes ice water after stirring for ½ hour, after the addition of the chloroformate. The carbonate separated as an oil which separated and the water layer was extracted with ether. The ether extracts and oil were combined and washed very thoroughly with cold water. After drying, the ether was removed by distillation and the residual oil fractionated. The yield of light yellow 4,4' - bis(β - hydroxyethoxy)benzanilide-bis(ethyl carbonate), M. P. 42–45° C., was 71% the theoretical value. Analysis calcd. for $C_{23}H_{27}O_9N$: C, 60.0; H, 5.8; N, 3.0. Found: C, 59.6; H, 5.7; N, 3.2.

EXAMPLE 2e

*Polymerization of 4,4'-bis(β-hydroxyethoxy)benzanilide-bis(ethyl carbonate)*

Five grams of 4,4'-bis(β-hydroxyethoxy(benzanilide-bis-(ethyl carbonate), ten grams of 1,4-bis(β-hydroxyethyl)-benzene-bis-(ethyl carbonate) and 0.02 g. of $MgTi(OC_4H_9)_6$ were placed in a polymerization tube under a nitrogen atmosphere. The tube was inserted into an oil bath, heated to 100° C., and nitrogen was bubbled through the light yellow melt. The temperature was slowly raised. At 160° C., a noticeable amount of ethyl carbonate was liberated. When the temperature had reached 240–250° C., the temperature was kept approximately at this point for ½ hour. The system was then placed under a reduced pressure of 0.3 mm. for one hour.

The product obtained was a viscous melt which crystallized to form a white, hard polymer of high intrinsic viscosity which could be formed into useful fibers, films, rods tubes, etc.

The bis-(carbonate) monomer of Example 2d can be homopolymerized to form a useful polymer; however, it can be more advantageously employed to form an interpolycarbonate as described in Example 2e.

EXAMPLE 3

*Polycarbonate employing magnesium titanium lauroxide as catalyst*

To a quantity of fifty grams of 1,4-bis-(β-hydroxyethyl)-benzene-bis-(ethyl carbonate) there was added 0.1 gram of $MgTi(OC_{12}H_{25})_6$ as a solution in a mixture of lauryl and ethyl alcohols. The mixture was then heated in an atmosphere of nitrogen at 230° C. for two hours (stage I). The resulting product was stirred and heated at 250° in vacuum (0.2 mm.) for an additional two hours (stage II). The resulting viscous clear dope crystallized with extreme rapidity to give a white porcelain-like product; M. P. 215° C.; viscosity 0.85.

EXAMPLE 4

*Polycarbonate employing magnesium titanium hendecoxide as catalyst*

Two hundred grams of 4,4'-bis-(β-hydroxyethyl)-biphenyl-bis-(phenyl carbonate) was melted, and 0.39 g. of $MgTi(OC_{11}H_{23})_6$ was added as a solution dissolved in hendecyl alcohol. The reaction mixture was heated under an atmosphere of nitrogen for an hour and twenty minutes in an oil bath at 200–240° C. (stage I). During this period, the phenyl carbonate which was formed was distilled from the reaction flask. The reaction mass was then stirred at 0.5 mm. Hg pressure for three hours and forty minutes while heated in a 255° C. oil bath (stage II). Upon cooling, a white crystalline porcelain-like product was obtained. The intrinsic viscosity as measured in a 60:40 phenol: tetrachloroethane mixture was 0.73; M. P. 210° C.

EXAMPLE 5

*Polycarbonate employing magnesium titanium ethoxide as catalyst*

Fifty grams of 1,4-bis-(β-hydroxyethyl)-benzene-bis-(ethyl carbonate) and 1.5 cc. of ethyl alcohol containing 0.1 gram of $MgTi(OC_2H_5)_6$ was heated for two hours, under nitrogen at 250° C. The ethyl carbonate was allowed to distill. A vacuum pump was attached, the temperature raised to 260° C. and the reaction mixture stirred at 0.3 mm. of Hg for 85 minutes. Upon cooling, the product crystallized to a white, hard porcelain-like product. The intrinsic viscosity in a 60:40 phenol: sym. tetrachloroethane mixture was 0.79. The melting point was 218° C.

The catalysts employed in accordance with the instant invention result in the production of polycarbonates which have the advantageous properties described hereinabove whereas many of the other better known ester-interchange catalysts are either entirely unsatisfactory or result in the production of polycarbonates which have a low molecular weight and contain insoluble products of inferior properties. Such inferior products result when sodium is employed as the catalyst, as well as when other presumably efficient ester-interchange catalysts are employed. For example, lithium aluminum ethylate is known to be an efficacious ester-interchange catalyst; however, it has not been found to be satisfactory in preparation of the products of this invention since inconsistent results are obtained and the polymers obtained are often of the insoluble type, especially when polymerization is not terminated at the precise optimum moment; larger runs have resulted in particularly poor products. Moreover, some bimetallic titanium catalysts such as sodium hydrogen titanium butoxide are also unsatisfactory. It appears that these unsatisfactory catalysts produce unsaturation within the molecule whereby olefinic character such as in styrene is created. As a result, the polymers produced are not linear in structure, but are cross-linked and of no value for fibers, film, etc. where molecular orientation is desired.

It would appear that the structure existing in the principal bis-(carbonate) monomers described above is unstable and decomposes in the presence of most ester-interchange catalysts to yield various undesirable products.

This situation demonstrates the unusual advantages of employing the alkaline earth metal titanium alkoxides covered by the applicants' invention. Several of the preceding examples illustrate the employment of these catalysts. As is indicated, it is sometimes advantageous to employ these catalysts dissolved in an alcohol to facilitate handling the catalyst.

A means of studying the various catalysts was devised by heating β-ethoxy-carbonyloxyethylbenzene at 250° with the catalysts under test. A good catalyst causes the elimination of diethyl carbonate with the formation of di(β-phenyl-ethyl) carbonate.

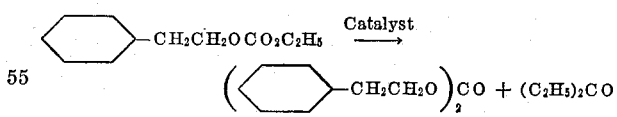

Poor catalysts cause the elimination of carbon dioxide and ethanol as follows:

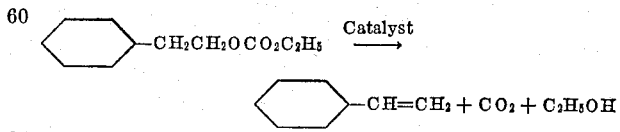

In the case of 1,4-bis(β-ethoxycarbonyloxyethyl)benzene (designated $Z_{12}$), the second reaction would lead to the formation of carbon dioxide, ethanol and p-divinylbenzene. The latter would polymerize, under the reaction conditions, leading to cross-linked and insoluble polymers. During the evaluation of the catalysts using 50-gram samples of β-ethoxycarbonyloxyethylbenzene, the amount of carbon dioxide evolved during a given time is used as an index of catalyst quality. Table I shows the results of evaluations of the catalysts.

Table I.—*Catalyst study using 50 grams β-ethoxycarbonyloxyethylbenzene*

| Catalyst | Catalyst amount, g. | Wt. of distillate, g. | Wt. $CO_2$, g. |
|---|---|---|---|
| Lithium Methoxide | .0637 | 12.18 | .740 |
| Lithium Aluminum Ethoxide | .24 | 10.43 | .560 |
| Lithium Stearate | .4950 | 8.410 | .817 |
| Lithium Acetate | .1709 | 1.088 | .202 |
| Lithium Hydrogen Titanium Butoxide | .2464 | 8.086 | .112 |
| Potassium Hydrogen—Titanium Butoxide | .2571 | 16.861 | 3.790 |
| Lithium Salicylate | .2418 | 9.780 | .037 |
| Sodium Salicylate | .2688 | 8.214 | .721 |
| Magnesium Salicylate | .2506 | 6.444 | .071 |
| Calcium Salicylate | .2638 | .000 | .013 |
| Lithium-2-Acetoxy Benzoate | .3125 | 7.619 | .562 |
| Lithium-2-Methoxy Benzoate | .2654 | 11.385 | .613 |
| Lithium-3-Methoxy Benzoate | .2654 | 11.728 | 1.073 |
| Sodium Benzoate | .2419 | 8.214 | 2.665 |
| Magnesium Butoxide | .1431 | 8.780 | .022 |
| Magnesium Chloride | .1705 | 7.115 | .070 |
| Magnesium Titanium Butoxide | .1429 | 4.441 | .003 |
| Magnesium Aluminum Ethoxide ($Mg_3[Al(OC_2H_5)_6]_2$) | .0934 | 8.141 | .221 |
| Magnesium Aluminum Ethoxide ($Mg[Al(OC_2H_5)_4]_2$) | .0920 | 6.889 | .919 |
| Titanium Ethoxide | .0960 | 6.367 | .020 |
| Titanium Isopropoxide | .1190 | 6.744 | .029 |
| Titanium Butoxide | .10 | 5.560 | .021 |
| Titanium Tetrachloride | .0797 | 6.800 | .028 |

The catalysts illustrated above, where little or no carbon dioxide was eliminated during the condensation, were tried using 1,4-bis(β-ethoxycarbonyloxyethyl)benzene under the usual polymerization conditions. It was thereby indicated that the above method served only as a preliminary screening method for evaluating catalysts, since several compounds indicated by the above technique to be good catalysts for the single-ender, were shown during polymerization to be unsatisfactory in that sufficient carbon dioxide was eliminated to cause the formation of cross-linked polymers. The cross-linking leading to insoluble polymers is believed to result from the formation of p-divinylbenzene and its subsequent polymerization.

Table II summarizes the results when 80 g. of 1,4-bis(β-ethoxycarbonyloxyethyl)-benzene was heated with various supposedly better catalysts as indicated from the experiments tabulated in Table I. Stage II was carried out at 0.1–0.3 mm. at 250° C. and Stage I was carried out at 235° C. at atmospheric pressure:

Table II

| Ex. | Catalyst | Cat. Wt., g. | Stage I, Time, minutes | Stage II, Time, minutes | Viscosity | Remarks |
|---|---|---|---|---|---|---|
| 6 | $MgTi(OBu)_6$ | 0.1 | 35 | 70 | 0.97 | White polymer, M. P. 236. |
| 7 | $Mg(OBu)_2$ | 0.1 | 15 | | | No diethyl carbonate split out |
| | $Ti(OBu)_4$ / $Mg(OBu)_2$ | 0.1 | 21 | 75 | 0.73 | White polymer, M. P. 237. |
| | Mg Salicylate | 0.1 | | | | No diethyl carbonate split out |
| | Lithium Salicylate | 0.1 | 30 | 75 | | Yellow sponge, M. P. 241. |

It is, therefore, apparent that magnesium titanium butoxide is a superior catalyst, the enhanced activity of which we attribute to a fast reaction rate as in Equation 1 and a slow rate with regard to Equation 2. Moreover, magnesium titanium butoxide shows an additional advantage, in that less color is produced by its use, than occurs when titanium butoxide is employed.

Table III is similar to Table II as regards the bis-(monomer) and conditions employed; however, this table presents five additional examples showing the use of the catalysts of this invention:

Table III

| Ex. | Catalyst | Cat. Wt., g. | Stage I, Time, minutes | Stage II, Time, minutes | Viscosity | M. P., °C. |
|---|---|---|---|---|---|---|
| 8 | $Sr(OCH_3)_2Ti(OBu)_4$ | 0.1 | 15 | 45 | 0.71 | 237 |
| 9 | $Ca(OCH_3)_2Ti(OBu)_4$ | 0.1 | 90 | 75 | 0.90 | 235 |
| 10 | $MgTi(OBu)_6$ | 0.05 | 25 | 120 | 0.77 | 236 |
| 11 | $MgTi(OBu)_6$ | 0.05 | 210 | 120 | 0.87 | 238 |
| 12 | $MgTi(OBu)_6$ | 0.1 | 35 | 80 | 0.97 | 237 |

Example 12 gave a material which could not be shock-cooled or quenched in the same way as in preceding examples where it was possible to form sheets which could be readily quenched to give clear sheets suitable for the preparation of films stretched or drawn in two dimensions. This difficulty as regards Example 12 illustrates the fact that in some instances it is important not to use so much of the catalyst. Examples 10 and 11 which use only half as much catalyst gave polymers which could be readily quenched.

The situation just discussed emphasizes the advantageous character and critical nature of the invention which has provided a way for producing polymers of the described bis-(carbonate) monomers which can be readily quenched so as to greatly facilitate the production of useful fibers, films, etc.

The polycarbonates referred to herein can be prepared employing other species of the specified genus of catalysts and other reaction conditions in a manner analogous to that described in the preceding examples within the scope of the ranges and limits set forth hereinbefore.

The polymeric products embodying this invention can be prepared either batch-wise or continuously, and can be used alone or in admixture with similar or dissimilar polymeric materials and with or without the usual modifiers or compounding agents for polymeric materials. Materials embodying the invention can be used for forming fibers, for extrusion or molding applications, or for film or sheet applications such as for film supports for black and white or color photographic films.

The photographic films which can be produced can advantageously comprise a film support of the above-described polycarbonates upon which is deposited one or more layers of a silver halide emulsion which can contain appropriate sensitizers or other additives to suit the intended photographic use.

The high degree of utility of the polycarbonates prepared in accordance with this invention can be primarily attributed to the use of the alkaline earth metal titanium alkoxide catalysts which make it possible to produce polycarbonates which can be formed into fibers or sheets which can be quenched with reasonable facility and readily drawn or tentered and heat treated to form fibers or sheets having exceptionally valuable properties. The most noticeable improvement effected by these catalysts lies in the ease with which satisfactory quenching can be accomplished.

We claim:
1. A process for preparing a highly polymeric linear polycarbonate comprising (A) self-condensing a bis-(carbonate) monomer selected from the group consisting of those having the following formulas:

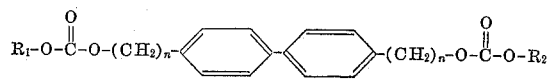

and

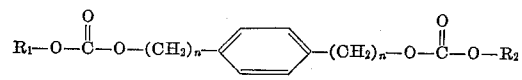

wherein $R_1$ and $R_2$ each represents a radical selected from the group consisting of lower alkyl radicals containing from 1 to 4 carbon atoms and aryl radicals of the benzene series containing from 6 to 8 carbon atoms and $n$ represents a positive integer of from 2 to 6, (B) in the presence of an ester-interchange catalyst selected from the group consisting of those having the following formula:

$$M(OR)_2Ti(OR)_4$$

wherein M represents a metal selected from the group consisting of magnesium, calcium and strontium and each R represents an alkyl radical containing from 1 to 18 carbon atoms, (C) at an elevated temperature which volatilizes $R_1$ and $R_2$ carbonates, (D) the condensation being conducted in an inert atmosphere and (E) the condensation being conducted at a pressure below 15 mm. of mercury pressure during the portion of the condensation following the substantially complete removal of the $R_1$ and $R_2$ carbonates volatilized during the earlier part of the condensation.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis(carbonate) monomer.

4. A process as defined in claim 3 wherein the low pressure is less than about 15 mm. of Hg pressure.

5. A process as defined in claim 4 wherein the bis-(carbonate) monomer is a 1,4-bis-(β-hydroxyethyl)-benzene-bis-(alkyl carbonate).

6. A process as defined in claim 5 wherein the catalyst is a calcium titanium alkoxide.

7. A process as defined in claim 4 wherein the bis-(carbonate) monomer is a 4,4′-bis-(β-hydroxyethyl)-biphenyl-bis-(alkyl carbonate).

8. A process as defined in claim 7 wherein the catalyst is a magnesium titanium alkoxide.

9. A process as defined in claim 7 wherein the catalyst is a calcium titanium alkoxide.

10. A process as defined in claim 7 wherein the catalyst is a strontium titanium alkoxide.

References Cited in the file of this patent

UNITED STATES PATENTS

| | | |
|---|---|---|
| 2,455,652 | Bralley | Dec. 7, 1948 |
| 2,720,502 | Caldwell | Oct. 11, 1955 |

OTHER REFERENCES

C & E News: 33, 4226, 4228, October 3, 1955.